United States Patent [19]
Levac et al.

[11] Patent Number: 6,034,970
[45] Date of Patent: Mar. 7, 2000

[54] INTELLIGENT MESSAGING SYSTEM AND METHOD FOR PROVIDING AND UPDATING A MESSAGE USING A COMMUNICATION DEVICE, SUCH AS A LARGE CHARACTER DISPLAY

[75] Inventors: Ronald A. Levac, Hartland; Stephen D. Bilgrien, Iron Ridge; Michael J. Peters, Menomonee Falls, all of Wis.; Robert K. Kuecherer, Bayfield, Colo.

[73] Assignee: Adaptive Micro Systems, Inc., Milwaukee, Wis.

[21] Appl. No.: 08/887,445

[22] Filed: Jul. 2, 1997

[51] Int. Cl.[7] .................................................. H04J 3/16
[52] U.S. Cl. ............................................................ 370/466
[58] Field of Search ................................... 370/464, 465, 370/466, 256, 408, 401, 389, 395, 252, 241; 340/825.44, 825.36, 825.34, 825.17, 825.27, 825.26, 825.15; 704/201, 203, 224, 228, 250, 249, 302; 710/105; 711/202, 206; 455/426, 457, 458; 379/88, 89, 87, 83, 93.15, 93.14, 93.17

[56] References Cited

U.S. PATENT DOCUMENTS

| | | |
|---|---|---|
| 4,837,798 | 6/1989 | Cohen et al. . |
| 4,910,765 | 3/1990 | Matsuse et al. . |
| 5,138,653 | 8/1992 | Le Clercq . |
| 5,146,488 | 9/1992 | Okada et al. . |
| 5,177,680 | 1/1993 | Tsukino et al. . |
| 5,317,568 | 5/1994 | Bixby et al. ............................. 370/401 |
| 5,333,266 | 7/1994 | Boaz et al. . |
| 5,381,527 | 1/1995 | Inniss et al. . |
| 5,406,557 | 4/1995 | Baudoin . |
| 5,428,663 | 6/1995 | Grimes et al. . |
| 5,459,775 | 10/1995 | Isono et al. . |
| 5,479,408 | 12/1995 | Will . |
| 5,479,411 | 12/1995 | Klein . |
| 5,487,100 | 1/1996 | Kane . |
| 5,495,234 | 2/1996 | Capp et al. . |
| 5,509,000 | 4/1996 | Oberlander . |
| 5,513,126 | 4/1996 | Harkins et al. . |
| 5,517,622 | 5/1996 | Ivanoff et al. .......................... 370/256 |
| 5,524,137 | 6/1996 | Rhee . |
| 5,608,786 | 3/1997 | Gordon . |
| 5,627,997 | 5/1997 | Pearson et al. . |

OTHER PUBLICATIONS http://congnisoft.com; Information retrieved from Internet Web site on Sep. 25, 1996 and Sep. 26, 1996.
http://www.globalvillage.com; Information retrieved from Internet Web site on Dec. 10, 1996; Press Release dated Mar. 18, 1996.
1996 Global Village Communication; FocalPoint data sheets.
http://www.frontec.com; Information retrieved from Internet Web site on Dec. 11, 1996; Press Releases dated Apr. 24, 1995, Jul. 18, 1995, Mar. 4, 1996, Jan. 22, 1996, May 20, 1996.
1996 Frontec AMT, Inc., Intelligent Messaging Solutions: It's About Time, pp. 1–10.
1996 Frontec AMT, Inc., The AMTrix System Product Overview, pp. 1–8.
Frontec, The AMTrix System Product Description, Sep. 1, 1996.
Messaging: The Intelligent Way, from Business Systems Magazine, dated Aug., 1996.

Primary Examiner—Dang Ton
Attorney, Agent, or Firm—Foley & Lardner

[57] ABSTRACT

An intelligent messaging system automatically conveys messages generated by a variety of message sources to one or more designated message recipients who receive communications via different types of communication devices, including a large character display. A message server automatically dispatches messages and updates to messages to a communication device interface which converts the message and message updates to a protocol compatible with the types of communication devices used by the designated message recipients. The converted message is further routed to local or remote communication destinations at which the message recipients' communication devices are located. Automatic, real-time updates of messages can thus be achieved.

40 Claims, 5 Drawing Sheets

INTELLIGENT MESSAGING SYSTEM AND METHOD FOR PROVIDING AND UPDATING A MESSAGE USING A COMMUNICATION DEVICE, SUCH AS A LARGE CHARACTER DISPLAY

BACKGROUND OF THE INVENTION

The present invention relates generally to communication systems. More particularly, the invention relates to an intelligent messaging system in which messages generated by a variety of message sources, and updates to such messages, are automatically converted to the proper protocol and conveyed to various types of communication devices, including a character display, located at a variety of communication destinations.

In today's world, many different communication formats have become commonplace. By way of example, people often communicate via electronic mail (e-mail), voice mail, facsimile or pager. In addition, people may use many different messaging services or software applications to handle their messaging needs. Although a great technological advance, the availability of these various communication formats has spawned inefficiency and complexity since sending messages to diverse communication devices or receiving messages from various message sources often entails accessing several different messaging services or software applications.

Known prior art systems have attempted to address these problems. For example, one system discloses a unified messaging system in which a user has unified access to any messaging service. All messages to a specified user, regardless the source, are automatically routed to a user-designated messaging mailbox. The mailbox notifies the user that a new message has been received. In the event the message could not be forwarded to the mailbox, the notification relays the information that the message is waiting on another service. Although, the unified messaging system addresses the problems of receiving messages from different message sources and the need to access a large number of messaging services, it does not offer a solution for efficiently sending communications to diverse communication devices nor does it entirely eliminate the requirement for contacting more than one messaging service or activating more than one software application.

In today's workplace, efficient communication with many different individuals or groups of people has become paramount. Unfortunately, as not everyone sends or receives messages via the same type of message source or communication device, a single message intended for many different recipients often cannot be sent using a single communication format or a single messaging service. For example, a manager at a facility employing both office workers and assembly line workers might want to distribute a company-wide message. The manager can communicate with the office workers via e-mail, but can reach the assembly line workers only by physically posting the message on a bulletin board or displaying the message on a message marquee, such as a large character display. Thus, to communicate with all the intended recipients, the message originator is forced to generate the same message repeated times using various communication formats.

It would therefore be advantageous to provide an intelligent messaging system that conveys a message generated by a message source to designated recipients who receive communications via diverse types of communication devices. The system would include a communication source interface having an open architecture capable of receiving messages, message parameters and variable data from diverse communication sources, whether originated by individuals using a variety of user interfaces or originated by automated sources, such as other software applications or hardware devices. The communication source interface would also automatically create a message file including the message or variable data and at least the essential data parameters required to convey the message to designated recipients. The communication source interface would submit the message file or the variable data or both to a message server that automatically directs the message or variable data to the appropriate protocol converter for conveyance to the designated recipients' communication devices which may be located at various communication destinations. Furthermore, the intelligent messaging system would automatically update a message with real-time variable data or current information content.

SUMMARY OF THE INVENTION

The present invention relates to an innovative system and method for automatically conveying a message generated by one of a variety of message sources to designated message recipients who receive communications via at least one of many types of communication devices, such as a character display, which display messages using different formats and which may be located at various communication destinations.

One aspect of the invention relates to a messaging system including a first message source interface, a second message source interface, a message server, a communication device interface and a character display. The first message source interface receives both messages and message parameters generated by a message source. The message parameters relay information related to the message, such as data identifying a first message recipient. The second message source interface is configured to receive update information related to the message. The first and second message source interfaces are in communication with the message server which receives the message, message parameters and update information and is configured to automatically dispatch at least the message and the update information based on the information included in the message parameters. The communication device interface receives the dispatched message or update information and converts them to a protocol compatible with a character display. The message and update information may also be converted to other protocols compatible with the various other communication devices used by either the first message recipient or other message recipients identified by the data in the message parameters. The message and update information that are converted to the character display protocol are conveyed to the character display which then displays characters representative of the message and the update information. The characters of the character display have a height substantially equal to or greater than one-half inch.

Another aspect of the invention relates to a method for automatically sending a communication to at least one of a plurality of types of communication devices which are located at a plurality of communication destinations. Each type of communication device communicates in a format, such as e-mail, voice mail, audio or large visual display characters, different than the other types of devices. To convey the message, a message file is generated based on a received message that is addressed to at least a first message recipient. The message file includes a message portion and a message parameter portion that includes the data identifying the first message recipient. The message file is conveyed to a message server and, based on the message parameter portion, at least a character display is selected from amongst the plurality of types of communication devices. A communication destination, at which at least the character display is located, is also selected based on the data in the message parameter portion of the message file. The message portion of the message file is then converted at least to a protocol compatible with the character display, and the converted message is then dispatched. The character display receives and displays characters representative of the converted message using characters that have a height substantially equal to or greater than one-half inch and that are visible to at least the first message recipient.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
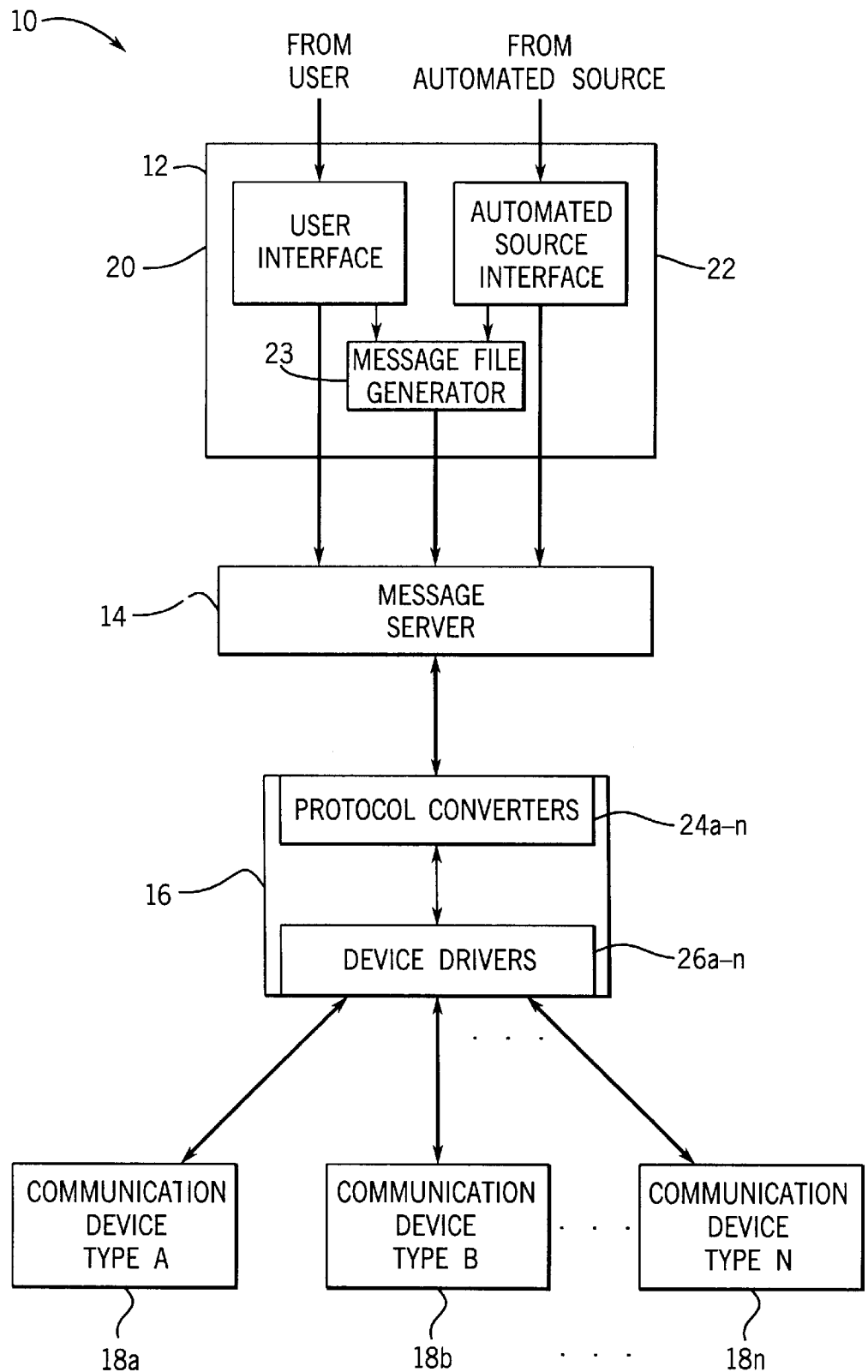
FIG. 1 is a system level block diagram of an exemplary embodiment of an intelligent messaging system illustrating the relationship between various levels of the system.

Turning now to the figures, and referring specifically to FIG. 1, a system level diagram of an intelligent messaging system 10 is illustrated. System 10 offers an open architecture compatible with a wide variety of communication sources and communication devices used by various individuals or groups of individuals. Accordingly, a message generated by a source (e.g., an individual or user, a real-time data source, a sensor or other software applications or hardware devices) can be automatically conveyed to diverse communication devices, such as networked personal computers, message marquees (e.g., large character displays), telephone systems, alphanumeric and vibrating pagers, fax machines, audio devices, information kiosks, internet/intranet terminals or electronic bulletin boards. Because of the versatility of system 10, system 10 is particularly suited for use in many applications, such as employee communications, emergency messaging, dispatching, automatic call distribution and real-time production data messaging. Types of messages include text, voice, or text-to-speech messages, alarm notifications, variable data updates, notifications of Web site updates on the Internet, HTML Web pages, audio or graphics files, source commands and requests for data or responses from the communication device. Further, system 10 allows the different applications to run simultaneously, thus providing an efficient, versatile and intelligent integrated messaging system.

As depicted in FIG. 1, system 10 includes a communication source interface 12, a message server 14, a communication device interface 16 and a plurality of types of communication devices 18a–n. Communication source interface 12 preferably includes a plurality of message source interfaces, such as a user interface 20 and an automated source interface 22, as well as a message file generator 23. User interface 20 permits an individual to generate a message, such as with a text editor, a voice-to-text system, a graphics program or a database, and to provide message parameters providing information about the message, such as the designated recipients, running time for the message etc. User interface 20 also permits an individual to input variable data, or other update information, for updating a previously generated message, or allows the individual to create a message template that may be used in conjunction with data, messages, or other information received by automated source interface 22. Automated source interface 22 allows messages, text files and variable data, or other update information, from automated sources (e.g., software applications resident on a mainframe, a server or a personal computer, or hardware devices, such as a telephone, modem, facsimile machine, etc.) to be input into system 10 via communication links, such as a telephone system, a cellular system, the Internet, an intranet or other wired and wireless systems. Messages received by communication source interface 12 are relayed to message server 14 either over a Dynamic Data Exchange ("DDE") link or are submitted as a message file which is automatically generated by message file generator 23. In alternative embodiments, messages can be relayed using different methods, such as a net DDE or OLE link, or in other file formats.

In the preferred embodiment, message file generator 23 creates the message file in a standardized file format (".msa") which is an Object Linking and Embedding ("OLE") compound file format. Message file generator 23 embeds the actual message in the .msa file together with primary data streams specifying essential message parameters, such as date, time and destination, required to transmit the message to the designated recipients. The .msa file may also include secondary data streams specifying optional message parameters associated with the message, such as the location of a graphics file attached to the message or the recurring run time interval for the message. Preferably, the .msa file created by message file generator 23 may incorporate, and in some instances must incorporate, the following information:

1. OWNER: identifies the user who created the file; consists of the length of the user's name followed by the user's name; required stream.
2. FILENAME: identifies the name the file was saved as by the user; consists of the length of the FILENAME followed by the FILENAME; required stream.
3. FILETYPE: identifies the format (for example, .wav or .msw) of the actual message as generated embedded within the .msa file; consists of the length of the FILETYPE followed by the FILETYPE; required stream.
4. DATA: contains the message and associated components, such as text characters or control codes, in the format defined by the FILETYPE stream; consists of the length of the DATA array followed by the DATA array; required stream.

5. DATATYPE: identifies the function of each component of the DATA stream; consists of the length of the DATATYPE array followed by the DATATYPE array; required stream. For example, the DATATYPE stream identifies whether a component is a control code or a text character.

6. RUNTIME: identifies the period of time the message should run; consists of the size of the RUNTIME structure followed by the RUNTIME structure; required stream. The RUNTIME structure includes the following fields:
   a. type: identifies the type of time, such as local time, time zone offsets, immediate, or de-activate.
   b. priority: indicates the priority of the message. The preferred embodiment includes three priority levels: normal, high and exclusive. The exclusive level is further divided into multiple sublevels. High priority messages run alternately with normal priority messages; exclusive message preclude non-exclusive messages from running; priority among multiple exclusive messages is determined in accordance with the assigned sublevel.
   c. sYear: specifies the year to start running.
   d. sMonth: specifies the month to start running.
   e. sDay: specifies the day to start running.
   f. sHour: specifies the hour to start running.
   g. sMinute: specifies the minute to start running.
   h. sSecond: specifies the second to start running.
   i. eYear: specifies the year to end running.
   j. eMonth: specifies the month to end running.
   k. eDay: specifies the day to end running.
   l. eHour: specifies the hour to end running.
   m. eMinute: specifies the minute to end running.
   n. eSecond: specifies the second to end running.

7. VARSTART: describes the variable conditions that must be satisfied before triggering a message to run; consists of the length of the VARSTART stream followed by the VARSTART stream; optional stream.

8. VARSTOP: describes the variable conditions that must be satisfied before shutting off the message; consists of the length of the VARSTOP stream followed by the VARSTOP stream; optional stream.

9. VARUSED: lists variables used in a message file; consists of the length of the VARUSED list followed by the VARUSED list; required stream if a variable is included in the message file; otherwise, an optional stream.

10. DESTPARAMS: supplies a list of destination parameters, such as recipient site location, required for transmitting the message to the destination; consists of the length of the DESTPARAMS list followed by the DESTPARAMS list; required stream.

11. RESPONSE IN: indicates that the recipient communication device should respond back to the message source after the message has been sent; provides the full path to the user's inbox into which the response should be place; consists of the length of the path followed by the path; optional stream. For example, this stream can request the recipient communication device to confirm receipt of the message. Alternatively, the communication devices can provide other information, such as temperature data sensed by an attache d temperature probe.

12. ATTACHMENTS: identifies any attachments associated with the message, such as a graphics or .wav file; consists of a stream name identifying where the contents of the attachment is stored followed by the full path to the source of the attachment; optional stream.

13. RECURRING: identifies a recurring time interval for running the message; consists of the size of the RECURRING structure followed by the RECURRING structure; optional stream. The RECURRING structure includes the following fields:
   a. recurs: identifies when the message is to recur. For example, the message may recur daily, weekly, monthly, multiple times on a day, etc.
   b. rate: specifies the rate, n, at which a daily, weekly, or monthly message recurs. For example, daily every n days, weekly every n weeks, etc.
   c. special: used only if the recurs field is set to monthly. The special field, for example, may specify that the message shall recur on the same data each month, on a specific day of each month, on a specific day of the week each month, etc.
   d. days: identifies the days during the week the message should recur if the recurs field is set to weekly or is set to monthly and the special field identifies a specific day.
   e. times: specifies the times during the day the message is to recur.
   f. Year: specifies the year to stop recurring.
   g. Month: specifies the month to stop recurring.
   h. Day: specifies the day to stop recurring.

Based on the contents of the .msa file data streams, message server 14 routes the message to communication device interface 16. The .msa file format described above, although preferred, is offered by way of example only. Message files may be submitted to server 14 in other types of formats, or formats that include fewer, more or alternative data streams.

In addition to submitting text messages and commands embedded in the .msa file to message server 14, automated source interface 22 provides an avenue for automated sources, such as real-time production databases, to provide variable data to update messages that are active in system 10. In the preferred embodiment, the variable data is submitted to message server 14 over a DDE link at regular intervals or whenever the data changes. Alternatively, variable data can be monitored and pending messages can be activated when the variable attains a specified value. In any event, message server 14 then routes the variable data and any activated messages to communication device interface 16.

Upon receipt of a .msa file or variable data from message server 14 and based on the contents of the received .msa file data streams or the data streams related to a previously activated message, communication device interface 16 converts the message embedded in the .msa file or the variable data to a protocol compatible with the communication devices 18a–n used by the designated recipients. The converted message or converted variable data is then conveyed to the appropriate communication devices 18a–n which are located at communication destinations selected based on the message parameters. Device interface 16 preferably includes a plurality of protocol converters 24a–n and a plurality of device drivers 26a–n. A plurality of protocol converters is used because each protocol converter 24a–n can convert the message or variable data to the protocol required for one type of communication device 18a–n. A plurality of device drivers 26a–n is required to interface system 10 to hardware needed to convey the converted message, the converted variable data, or both to communication devices 18a–n.

Figure 5:
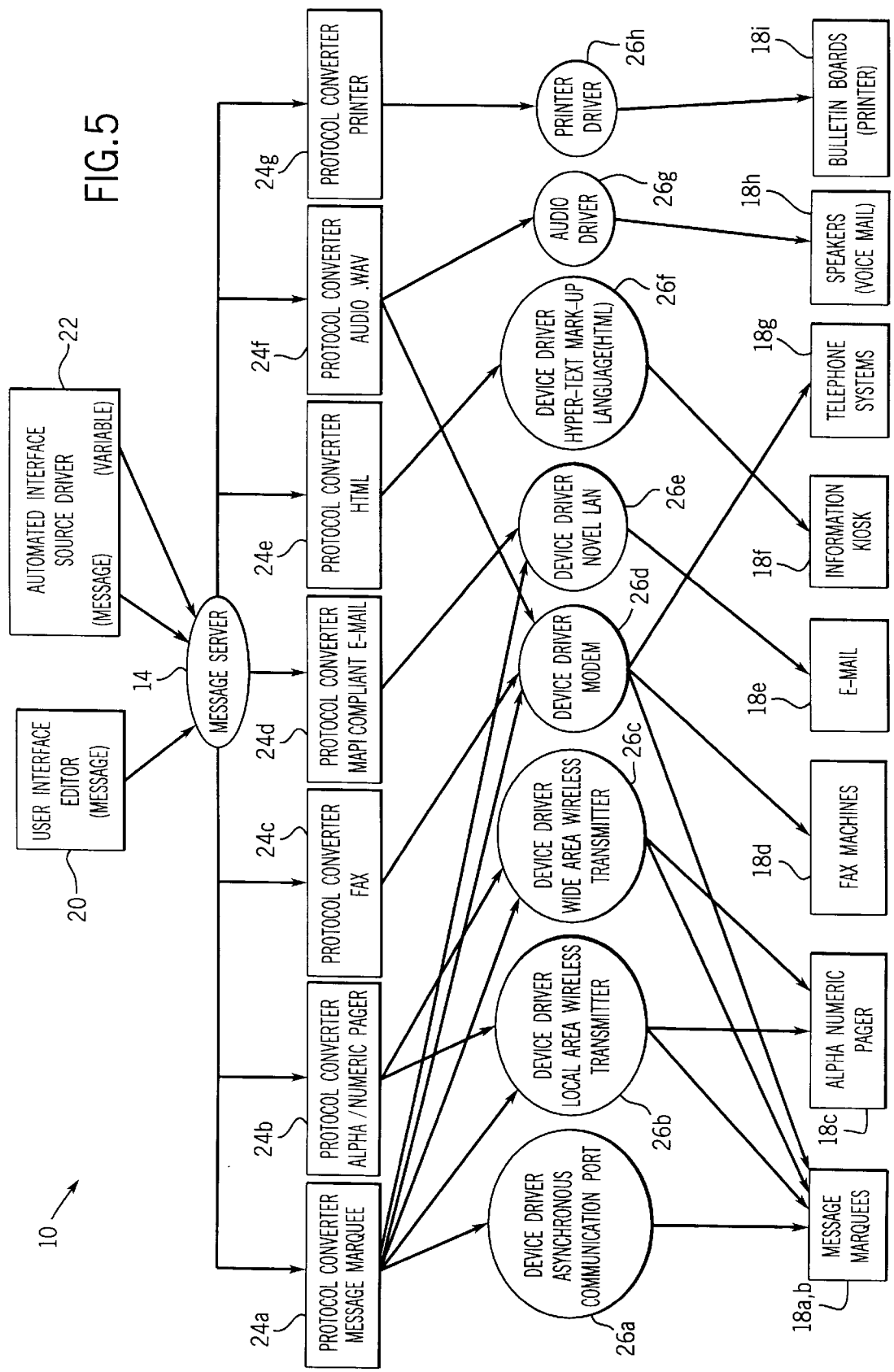
FIG. 5 is a system detail block diagram of an exemplary embodiment of the intelligent messaging system of FIG. 1, illustrating various types of communication devices and associated communication device interfaces.

The operation of communication device interface 16 may best be illustrated by referring ahead to FIG. 5 and by way of the following exemplary scenario. In this scenario, message server 14 receives a message file from message file generator 23 including a message intended for a first designated message recipient who receives communications via an alphanumeric display 18a located at a first communication destination that is hardwired to system 10, and for a second designated message recipient who both receives communications via an alphanumeric display 18b located at a second remote communication destination and via an alphanumeric pager 18c located at a third remote communication destination. A communication destination, as used herein, includes both a fixed site where communication devices 18a–n are located, as well as a roaming site where a communication device 18a–n, such as a pager, may be located. Message server 14 routes the message file to protocol converter 24a, which converts the message to a protocol compatible with large character displays and to protocol converter 24b, which converts the message to a protocol compatible with alphanumeric pagers. Protocol converter 24a then sends its converted message to device driver 26a, which provides an asynchronous port interface for communication with the hardwired large character display 18a, and to device driver 26b, which provides a wireless transmitter interface for communication with the remote character display 18b. Protocol converter 24b also sends its converted message to device driver 26b for communication with remote alphanumeric pager 18c.

In this example, large character displays 18a,b preferably are light-emitting-diode (LED) displays which display characters having a height substantially equal to or greater than one-half inch. The characters preferably include alphanumeric characters as well as icons or graphics, such as arrows, figures or punctuation marks. The displayed characters may be stationary, but preferably also flash, scroll or otherwise move across or on display 18. Further, the LEDs all may be of a single color, such as red, or may be of a variety of colors, such as red, green, and yellow, which may exhibit various intensities. Alternatively, character display 18 may be a liquid crystal display (LCD) or other type of display having characters having a height substantially equal to or greater than one-half inch. In any event, and as discussed above, character display 18 may be used to display various types of messages, such as employee communications or alarms. If used in an alarm system, character display 18 may display flashing characters and may be used in conjunction with an audible communication device 18n, such as a speaker, siren, or public address system, which provides audible indicia of the alarm.

As illustrated in FIG. 5, system 10 preferably includes various other types of protocol converters 24a–n that convert messages and variable data to protocols, such as are compatible with fax machines, e-mail systems, HTML files, audio devices (audio.wav) and printers. In addition, system 10 preferably includes a variety of other device drivers 26a–n which interface system 10 with, for example, local area and wide area personal computer networks, local area and wide area wireless networks, telephone networks and audio drivers. The various protocol converters 24a–n, device drivers 26a–n and communication devices 18a–n illustrated in FIG. 5 are offered by way of example only. Other types and configurations of converters, drivers and communication devices could also be adapted for use in system 10.

Figure 2:
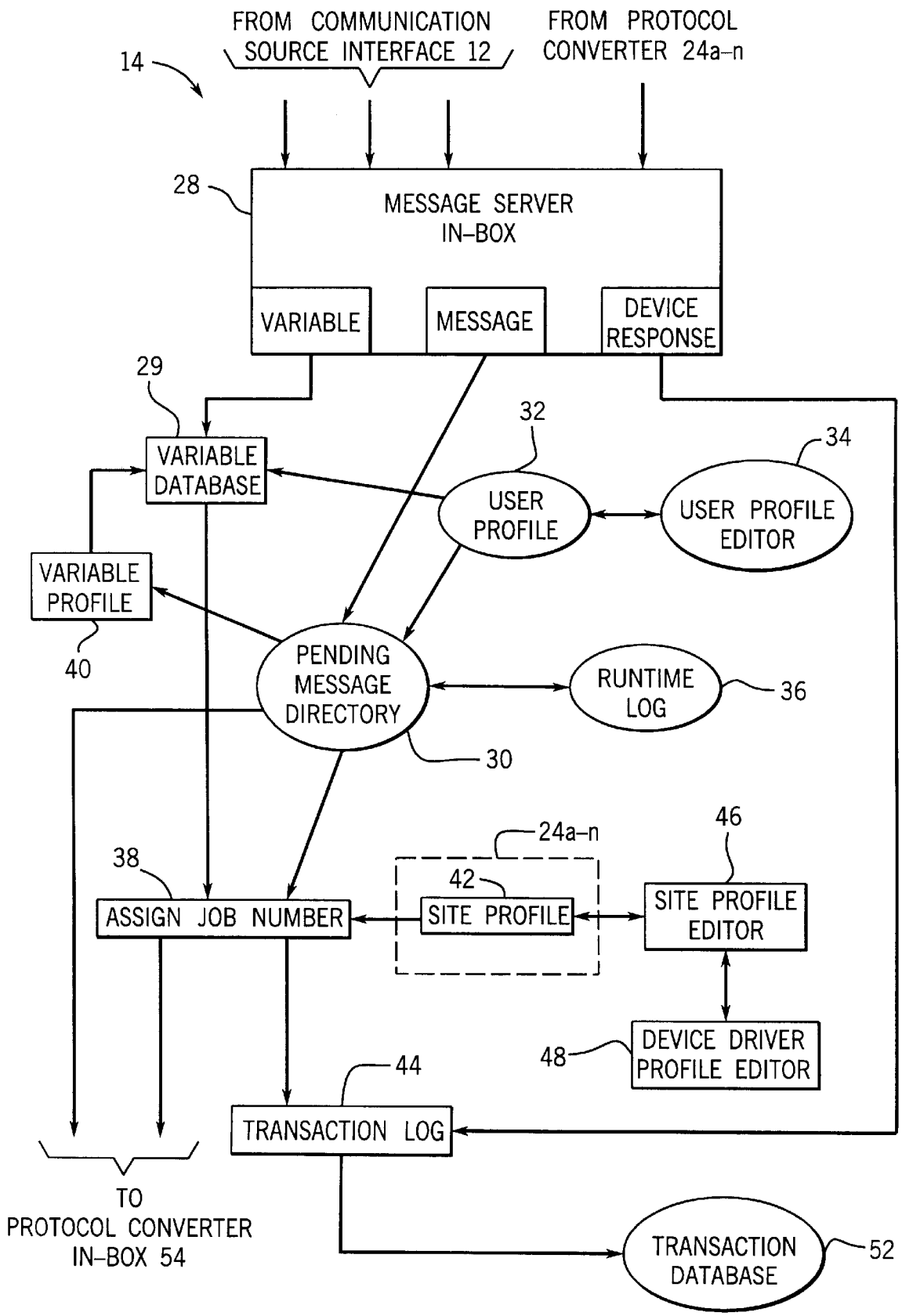
FIG. 2 is a flow chart illustrating data flow through an exemplary embodiment of the message server level of the system of FIG. 1.

Referring now to FIG. 2, data flow through message server 14 is illustrated. Message server 14 includes an in-box 28 providing the interface for receiving message files, commands and variable data from communication source interface 12, as well as response messages from communication devices 18a–n. Message server 14 supports various interfaces, such as sub-directory in-box, DDE or TCP/IP messaging. Thus, message files can be received from a variety of local or remote message sources and can be generated either by automated sources or individual users.

Variable data received in in-box 28 is sent to a variable database 29 which maintains a list of variable names and their corresponding parameters, such as value, update rate and destination. Message files received in in-box 28 are sent to a pending message directory 30 where held until activated. When message files are received, directory 30 checks a user profile 32 to verify that the user or automated source that generated the message has been authorized to transmit to communication devices 18a–n. As discussed above, data identifying the message source, designated recipients, site locations, etc. is included within the message file generated by message file generator 23. Users are required to register with a system administrator who assigns and edits the user rights contained in user profile 32 through a user profile editor 34. Similarly, variable database 29 checks with user profile 32 to verify the message source is authorized to send variables to the designated recipients who are using the specified communication devices 18a–n.

In the preferred embodiment, message server 14 also examines the data streams included in the message file to determine the running time for the message, and logs the information in a runtime log 36. Runtime log 36 then assumes responsibility for activating files pending in directory 30.

Once activated, pending message directory 30 passes the message file to an assign job number function 38. In addition, if the message file includes a variable, as indicated by the appropriate data stream, the message file also is submitted to a variable profile 40 and is stored in variable database 29. Variable profile 40 maintains information about the variables, such as variable contents and variable running time intervals, including a list of communication devices 18a–n which are displaying a message containing the variable. Thus, when variable database 29 receives updated variable data from message server in-box 28, database 29 refers to the list stored in variable profile 40 to determine which communication devices 18a–n require the updated data. Based on the information, variable database 29 activates the stored message file, updates the message file with the updated variable data, and submits the updated message file to assign job number function 38. In alternative embodiments, the variable data can be routed directly from variable database 29 to protocol converters 24a–n through a DDE interface and can then be submitted in an update packet to the appropriate communication device 18a–n. The system and method just described thus provides for automatic, real-time activation of messages and updates to already active messages.

As previously discussed, job number function 38 receives message files either from variable database 29 or pending message directory 30. Regardless of the source, job number function 38 assigns a unique job number to the message file. When runtime log 36 activates a pending message file, job number function 38 informs the appropriate protocol converters 24a–n by submitting an activate command to the protocol converter in-box 54. The appropriate protocol converters 24a–n are selected based on the message parameters included in the message file and information contained in a site profile 42 located in each protocol converter 24a–n. Protocol converter in-box 54 then retrieves the message from pending message directory 30 based on the information received from job number function 38. Finally, job number function 38 logs the status of the message transaction (e.g., "message running", "runtime complete", "error", etc.) in a transaction log 44.

A site profile editor 46 provides the vehicle for a system administrator to input and edit site information in site profile 42. A device driver editor 48 can be accessed through site profile editor 46 to input and modify information in a device driver profile 50. For example, site profile 42 includes information directing protocol converters 24a–n to appropriate device drivers 26a–n. Portions of this information can be derived through device driver editor 48.

Transaction log 44 maintains a record of all transactions performed by job number function 38. In addition, transaction log 44 stores device responses received through message server in-box 28. In-box 28 provides the interface for receiving responses required to and transmitted by communication devices 18a–n and for receiving transmission status information from devices 18a–n. Alternatively, requested responses can by-pass message server 14 and be sent directly to the requesting message source. A transaction database 52, in communication with transaction log 44, stores the contents of log 44 in an Open Database Connectivity ("ODBC") compatible format. For example, Microsoft's ACCESS is an ODBC compatible format which allows the user to generate a transaction report.

In addition to routing messages to protocol converters 24a–n, message server 14 also transmits server commands, such as the activate message command discussed previously. Other server commands can include a "delete message" command and a "delete all messages" command.

Figure 3:
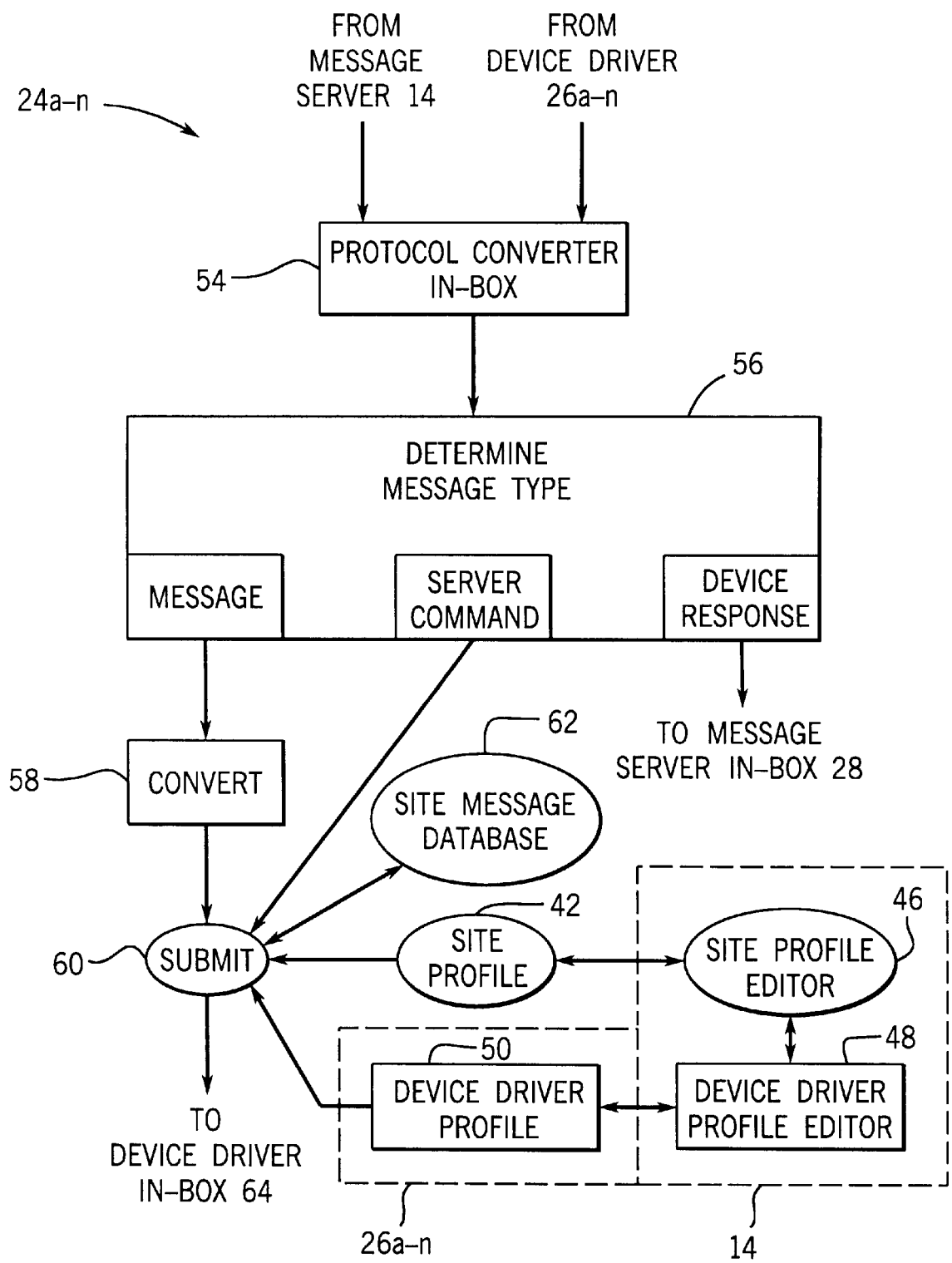
FIG. 3 is a flow chart of the data flow through an exemplary embodiment of a protocol converter which is included in the communication device interface level of the system of FIG. 1.

Referring now to FIG. 3, the data flow through an exemplary protocol converter 24a–n is illustrated in which protocol converter 24a–n receives messages and server commands from message server 14 and device responses from device drivers 26a–n. Each protocol converter 24a–n converts messages to a protocol associated with a particular type of communication device 18a–n. By way of example, protocol converter 24a converts messages to a protocol compatible with character displays; protocol converter 24b converts messages to a protocol compatible with alphanumeric pagers. Protocol converters 24a–n then determine and submit the converted message to the appropriate device drivers 26a–n.

As illustrated in FIG. 3, a protocol converter in-box 54 provides the interface for receiving various types of communications. The communication then proceeds to a data block 56, in which protocol converter 24a–n determines the type of communication by analyzing the message parameters in the .msa file. If protocol converter 24a–n determines that the communication is a message, variable data, or other update information, then the communication moves to a convert stage 58 in which the message, variable data, or other update information is converted to the protocol compatible with the selected type of communication device 18a–n. The converted item then moves to a submit stage 60. If the communication is a server command, then the server command bypasses convert stage 58 and moves directly to submit stage 60.

In submit stage 60, protocol converter 24a–n consults site profile 42 to select the appropriate device driver 26a–n. In addition, protocol converter 24a–n looks to device driver profile 50 located in each of device drivers 26a–n to determine where to send the converted file. The converted file is then submitted to the selected device drivers 26a–n and the details of the transaction are logged in a site message database 62.

If data block 56 determines that the communication received in in-box 54 is a device response, then protocol converter 24a–n routes the response to message server in-box 28 which, in turn, logs the response in transaction log 44. Alternatively, the device response can be sent directly from protocol converter 24a–n to the requesting message source. In the preferred embodiment, device responses can include reports from device drivers 26a–n regarding the status of a transmitted message. If the report states that the transmission was successful, then the device response will be routed to message server in-box 28 as previously described. However, if a failure was detected, then protocol converter 24a–n re-submits the original message for a repeated attempt. The submit retry count either can be defined by a user or can be a default value.

Figure 4:
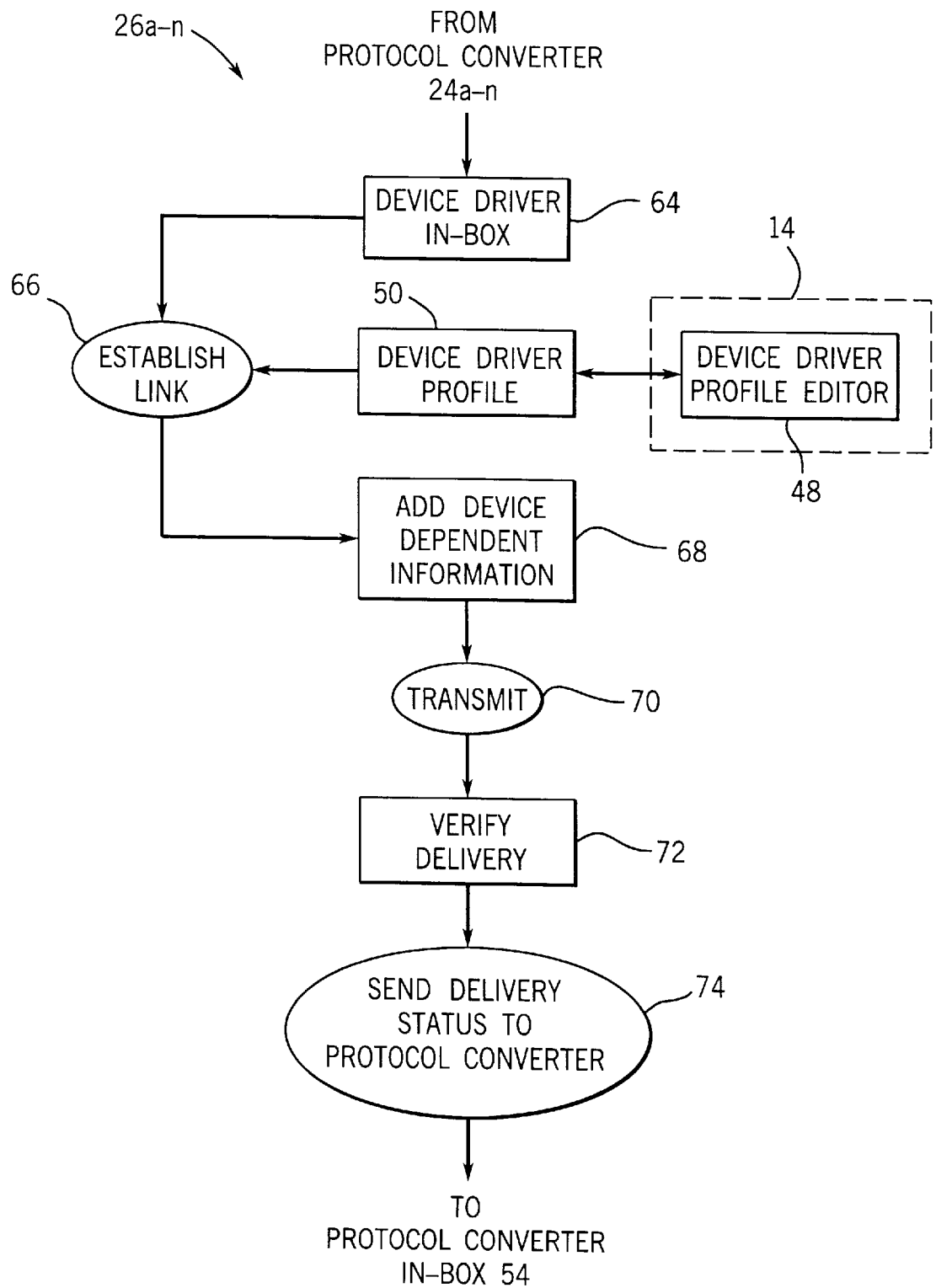
FIG. 4 is a flow chart depicting the data flow through an exemplary embodiment of a device driver, which also is included in the communication device interface level of the system of FIG. 1.

Referring now to FIG. 4, data flow through an exemplary device driver 26a–n is illustrated. First, a device driver in-box 64 receives the converted file from protocol converters 24a–n. Next, as shown in a data block 66, device driver 26a–n establishes a communication link to selected communication devices 18a–n by accessing device driver information, such as required data field lengths and initialization strings, contained in device driver profile 50. Based on the accessed information, and as illustrated in a data block 68, device driver 26a–n adds device dependent information to the message, such as headers or trailers. In a data block 70, the prepared communication is then transmitted to selected communication devices 18a–n, and the status of the transmission is verified in a data block 72. In a data block 74, the status information is delivered to protocol converter 24a–n through in-box 54. As described above, in the event the status indicates that the transmission failed, protocol converter 24a–n will submit the communication for another attempt.

Referring now to FIG. 5, an exemplary embodiment illustrates the versatility of system 10. The open architecture of system 10 supports diverse applications in which different types of messages generated by a variety of message sources are automatically converted to the appropriate protocol for conveyance to a variety of communication devices. Among the multitude of possible applications, the communication devices can be used, for example, to display test messages, to produce audio or visual messages or to provide data back to the system.

In another preferred embodiment, communication source interface 12 receives update information, such as news feeds, sports scores or Web site updates, from the Internet via a Transfer Control Protocol/Internet Protocol (TCP/IP) link. For example, an individual may create a message template for the update information using user interface 20. The message template can include the message parameters and a message field that may contain a message with a variable value or simply a variable value alone. The message template can then be imported into a data acquisition program that interfaces with, for example, automated source interface 22. The data acquisition program may include a Web scanning program, which is configured to monitor one or more Internet Web sites that are of interest to a designated message recipient. Upon detection of a modification to the information content of the Web site, the data acquisition program can update the variable value in the message template with information providing a notification of the modification. The data acquisition program can then convey the updated message template through automated source interface 22. The notification can simply be a communication alerting the message recipient of the modification (e.g., "www.xxx.com was updated on 1/1/97"), or can include a portion of the modified information content, such as new text, updated data or a new hyper-text (HTML) file. Message file generator 23 can then generate a .msa file based on the updated message template, which is submitted to message server 14. Alternatively, the data acquisition program may convert the updated message template to a .msa file and the submit the .msa file directly to server 14 through automated source interface 22.

As a further alternative, rather than import the message template into the data acquisition program, the message template with the variable value may be submitted to message server 14 through user interface 20 and message file generator 23 as a .msa file. The .msa file can then be stored in variable database 29 to await receipt of variable data, which, in this case, is the notification of modification to the information content of the monitored Web site. When the data acquisition program detects a modification, it can convey the notification through automated source interface 22 and then on to message server 14 and variable database 29 via a DDE link. Upon receipt of the notification, variable database 29 activates and updates the message template .msa file with the notification, and message server 14 conveys the updated .msa file to communication device interface 16. Alternatively, the notification alone can be routed directly from variable database 29 to communication device interface 16 via a DDE link.

While the embodiments illustrated in the figures and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A messaging system, comprising:
    a first message source interface to receive a message and message parameters related to the message, the message parameters at least including data identifying a first message recipient;
    a second message source interface to receive update information related to the message;
    a message server in communication with the first and second message source interfaces, the message server configured to receive the message, the message parameters and the update information and to automatically dispatch at least one of the message and the update information based on the message parameters;
    a communication device interface in communication with the message server, the communication device interface being configured to receive and to convert the at least one of the message and the update information to at least a first communication device protocol, thereby generating a first communication device message and first communication device update information; and
    a first communication device in communication with the communication device interface, the first communication device being configure to receive and provide indicia representative of the at least one of the first communication device message and first communication device update information, the indicia being sensible by the first message recipient.

2. The system of claim 1, wherein the first message source interface is a user interface.

3. The system of claim 2, wherein the second message source interface is an automated source interface in communication with an automated source and the update information is received from the automated source.

4. The system of claim 3, wherein the update information is real-time update information.

5. The system of claim 1, wherein the message parameters further include data identifying a time for automatically dispatching at least the message and the update information.

6. The system of claim 1, wherein the message includes a variable value and the update information includes variable data for updating the variable value.

7. The system of claim 1, wherein the second message source interface receives update information via the Internet.

8. The system of claim 7, wherein the second message source interface receives the update information from a Web site having information content and the update information is a notification of modification to the information content.

9. The system of claim 8, wherein the notification is representative of at least a portion of the modification to the information content.

10. The system of claim 1, further comprising:
    a second communication device in communication with the communication device interface to receive at least one of a second communication device message and second communication device update information having a second communication device protocol, the second communication device being configured to provide indicia representative of the at least one of the second communication device message and the second communication device update information, the indicia being sensible to at least one of the first message recipient and a second message recipient identified by the data included in the message parameters,
    wherein the communication device interface includes first and second protocol converters, and
    wherein the message server automatically selectively dispatches at least one of the message and the update information to the first and second protocol converters based on the message parameters.

11. The system of claim 10, wherein the first and second communication devices are located at different communication destinations, and the communication device interface automatically selectively conveys at least one of the first communication device message, the first communication device update information, the second communication device message, and the second communication device update information to at least one of the communication destinations based on the message parameters.

12. The system of claim 10, wherein
    the first communication device is a character display and the indicia include characters having a height substantially equal to or greater than one-half inch, and
    the second communication device is one of a pager, a facsimile machine, a voice mail system, an electronic mail system, an alarm, a public address system, and a personal computer.

13. The system of claim 12, wherein the character display is an alphanumeric character display.

14. The system of claim 13, wherein the character display is an LED display.

15. A method for communicating using a character display, the method comprising the steps of:
    receiving a message;
    receiving message parameters related to the message, the message parameters including data at least designating a first message recipient;
    receiving update information related to the message;
    conveying at least one of the message and the update information to a message server;
    converting at least one of the message and the update information to a character display protocol, thereby generating a character display message and character display update information;

automatically dispatching at least one of the character display message and the character display update information to a character display based on the message parameters; and displaying on the character display characters representative of at least one of the character display message and the character display update information, the characters having a height substantially equal to or greater than one-half inch and being visible to the first message recipient.

16. The method of claim 15, wherein the step of automatically dispatching includes automatically dispatching at least one of the character display message and the character display update information having the character display protocol at a time specified by the message parameters.

17. The method of claim 15, wherein the message includes a variable value and the update information includes variable data, the method further comprising the step of updating the variable value with the variable data.

18. The method of claim 15, further comprising the step of monitoring an Internet Web site having information content and wherein the step of receiving the update information includes receiving a notification of a modification to the information content.

19. The method of claim 15, wherein the character display is an LED display.

20. The method of claim 15, further comprising the steps of:

automatically selectively converting at least one of the message and the update information based on the message parameters to a communication device protocol, thereby generating a communication device message and communication device update information;

automatically selectively dispatching at least one of the communication device message and the communication device update information to a communication device based on the message parameters; and providing with the communication device indicia representative of at least one of the communication device message and the communication device update information, the indicia being sensible to at least one of the first message recipient and a second message recipient designated by the data included in the message parameters.

21. The method of claim 20, wherein the character display and the communication device are located at different communication destinations and the method further comprises the step of automatically selectively dispatching at least one of the character display message, the character display update information, the communication device message, and the communication device update information to at least one of the communication destinations based on the message parameters.

22. The method of claim 20, wherein the communication device is one of a pager, a facsimile machine, a voice mail system, an electronic mail system, an alarm, a public address system, and a personal computer.

23. A messaging system, comprising;

a message source interface to receive a message addressed to at least a first message recipient;

a message file generator to generate a message file based on the message, the message file having a message portion and a message parameter portion, the message parameter portion including data identifying the first message recipient;

a message server to receive the message file from the message file generator and automatically dispatch at least the message portion in response to the message parameter portion;

a communication device interface in communication with the message server, the communication device interface being configured to receive and convert the message portion to at least a first converted message having a character display protocol and a second converted message having a communication device protocol; and a character display in communication with the communication device interface and configured to receive and display characters representative of the first converted message, the characters having a height substantially equal to or greater than one-half inch and being visible to the first recipient.

24. The system of claim 23, wherein the message parameter portion further includes data identifying a time for automatically dispatching at least the message portion.

25. The system of claim 23, wherein the message source interface further includes an update inter face to receive update information related to the message file.

26. The system of claim 25, wherein the message file includes a variable value and the update information includes variable data for updating the variable value.

27. The system of claim 25, wherein the update interface receives update information from an Internet Web site having information content and the update information is a notification of a modification to the information content.

28. The system of claim 27, wherein the notification is representative of at least a portion of the modification to the information content.

29. The system of claim 23, wherein the character display is an LED display.

30. The system of claim 23, further comprising:

a communication device in communication with the communication device interface to receive the second converted message, the communication device being configured to provide indicia representative of the second converted message, the indicia being sensible to at least one of the first message recipient and a second message recipient identified by the data included in the message parameter portion.

31. The system of claim 30, wherein the character display and the communication device are located at different communication destinations, and the communication device interface automatically selectively conveys at least one of the first converted message and the second converted message to at least one of the communication destinations in response to the message parameter portion.

32. The system of claim 30, wherein the communication device is one of a pager, a facsimile machine, a voice mail system, an electronic mail system, an alarm, a public address system, and a personal computer.

33. A method for automatically sending a communication to at least one of a plurality of types of communication devices, each of the plurality of types of communication devices communicating in a format different than the other types of communication devices, the plurality of types of devices being located at a plurality of communication destinations, the method comprising the steps of:

receiving a message addressed to at least a first message recipient;

generating a message file based on the message, the message file including a message portion and a message parameter portion, the message parameter portion including data identifying the first message recipient;

conveying the message file to a message server;

selecting at least a character display from the plurality of types of communication devices based on the message parameter portion;

selecting at least one of the plurality of communication destinations based on the message parameter portion, wherein at least the character display is located at the selected communication destination;

converting the message portion to at least a first converted message having a character display protocol;

dispatching at least the first converted message to the character display located at the selected communication destination in response to the message parameter portion; and displaying on the character display characters representative of the first converted message, the characters having a height substantially equal to or greater than one-half inch and being visible to the first message recipient.

34. The method of claim 33, wherein the dispatching step includes dispatching at least the first converted message at a time specified by the message parameter portion.

35. The method of claim 33, further comprising the steps of:

receiving update information related to the message file;

conveying the update information to the message server;

converting the update information to at least a converted update information having the character display protocol;

selectively dispatching the converted update information to the character display located at the selected communication destination based on the message parameter portion; and displaying the characters on the character display, the characters being representative of the converted update information.

36. The method of claim 35, wherein the message file includes a variable value and the update information includes variable data, the method further comprising the step of updating the variable value with the variable data.

37. The method of claim 35, further comprising the step of monitoring an Internet Web site having information content and wherein the step of receiving the update information includes receiving a notification of a modification to the information content.

38. The method of claim 33, wherein the character display is an LED display.

39. The method of claim 33, wherein the converting step includes converting the message portion to a second converted message having a communication device protocol compatible with an additional type of communication device selected from the plurality of types of communication devices, the dispatching step includes dispatching the second converted message to the additional type of communication device located at at least one communication destination selected from the plurality of communication destinations, and the method further comprising the step of providing with the additional type of communication device indicia representative of the second converted message, the indicia being sensible to at least one of the first message recipient and a second message recipient identified by the data included in the message parameter portion.

40. The method of claim 39, wherein the additional type of communication device is one of a pager, a facsimile machine, a voice mail system, an electronic mail system, an alarm and a personal computer.

* * * * *

UNITED STATES PATENT AND TRADEMARK OFFICE
CERTIFICATE OF CORRECTION

PATENT NO. : 6,034,970
DATED : March 7, 2000
INVENTOR(S) : Levac et al.

It is certified that error appears in the above-identified patent and that said Letters Patent is hereby corrected as shown below:

At column 1, line 6, please insert a section heading entitled --RELATED APPLICATIONS--.

At column 1, line 6, under the section heading entitled "RELATED APPLICATIONS", please insert --This application is a continuation-in-part of U.S. patent application SN 08/656,377, filed May 31, 1996.--

Signed and Sealed this

Sixth Day of February, 2001

Attest:

Q. TODD DICKINSON

*Attesting Officer*     *Director of Patents and Trademarks*